April 28, 1925.

C. H. BRIGGS 1,535,811

DEVICE FOR FREEING GLUTEN FROM STARCH

Filed Oct. 18, 1922

INVENTOR:
CHARLES H. BRIGGS.
BY Whiteley and Ruckman
ATTORNEYS.

Patented Apr. 28, 1925.                                              1,535,811

UNITED STATES PATENT OFFICE.

CHARLES H. BRIGGS, OF MINNEAPOLIS, MINNESOTA.

DEVICE FOR FREEING GLUTEN FROM STARCH.

Application filed October 18, 1922. Serial No. 595,414.

*To all whom it may concern:*

Be it known that I, CHARLES H. BRIGGS, a citizen of the United States, residing at Minneapolis, in the county of Hennepin and State of Minnesota, have invented certain new and useful Improvements in Devices for Freeing Gluten from Starch, of which the following is a specification.

My invention relates to devices for freeing gluten from starch. An object is to provide a device by means of which dough formed from the flour to be tested is subjected to a mixing or kneading action, and at the same time to a washing action so that the starch will be thoroughly washed out and the gluten left behind.

The full objects and advantages of my invention will appear in connection with the detailed description, and the novel features of my inventive idea will be particularly pointed out in the claims.

Figure 1:
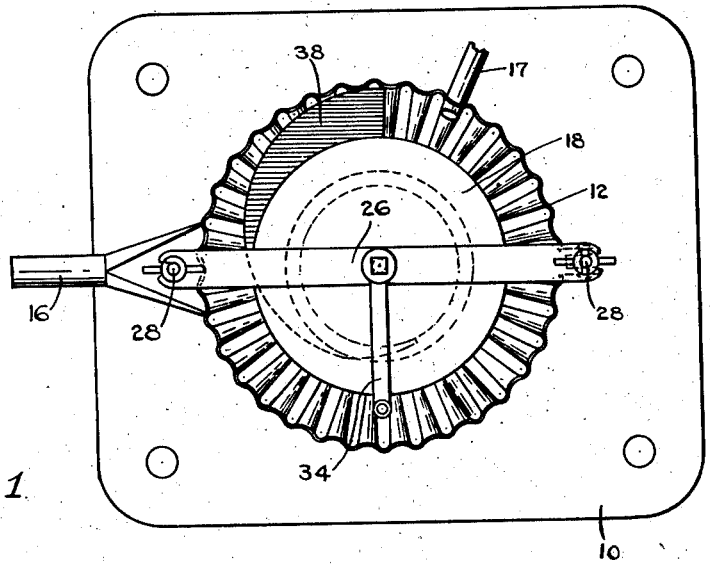
Figure 2:
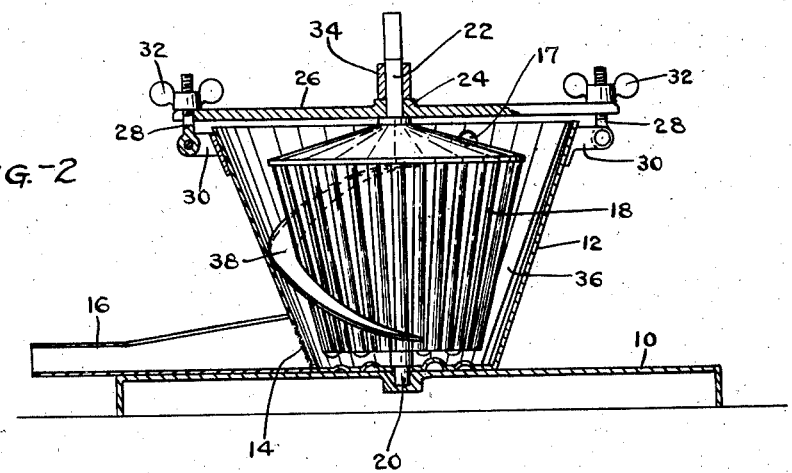

In the accompanying drawing which illustrates one form in which my invention may be embodied, Fig. 1 is a top plan view of the device. Fig. 2 is a side elevational view thereof partly in vertical section.

As shown in the drawings, I provide a base member 10 upon which is mounted a receptacle 12 having the form of the frustum of a cone with the smaller end down. The wall of this receptacle is roughened, this effect being produced in the form shown by corrugations extending lengthwise of the conical surface. The receptacle is provided adjacent its bottom with an opening covered by a wire screen 14 and from this opening extends a discharge spout 16. A pipe 17 for supplying water extends into the top of the receptacle 12. Inside this receptacle is a cooperating member 18 constructed in the form of the frustum of a cone with its smaller end down. This member is closed at its top and bottom so that material cannot get into the inside. At its bottom, this member is provided with a step-bearing 20 engaging the bottom of the receptacle 12 while a vertical shaft 22 secured to the member 18 extends upwardly from its center. This shaft is rotatably mounted in a bearing 24 formed in a bar 26 secured diametrally across the receptacle 12. In order to detachably secure the bar 26 in place the ends thereof are provided with slots adapted to receive bolts 28 pivotally attached to ears 30 carried by the receptacle 12 near its upper end. The bolts are provided with thumb nuts 32 adapted to be turned down upon the bar 26. When the nuts are loosened, the bar may be taken off and the member 18 removed from the receptacle 12. A handle 34 may be applied to the shaft 22 for rotating the member 18, or, if desired, the shaft may be rotated by power for which purpose its upper end is shown squared. The conical surface of the member 18 is corrugated or otherwise roughened, and this surface is less oblique than the conical surface of the receptacle 12 so that an annular chamber 36 is produced between the two members which gradually narrows from its top to its bottom. Secured to the outer wall of the conical member 18 is a spiral flange 38 which extends around in the annular chamber 36.

The operation and advantages of my invention will now be obvious. A ball of dough made from the flour to be tested is placed in the annular chamber 36. Water is admitted through the supply pipe 17 and the member is rotated. The dough is worked and kneaded between the two roughened surfaces, the spiral flange 38 tending to hold the dough downwardly in the annular chamber. Starch contained in flour is gradually washed out by the water and passes out through the screen 14. At the end of the operation the starch will have been removed while the gluten is left behind in the receptacle from which it can be removed and the amount thereof compared with the amount of flour used in making the test.

I claim:

1. A device for freeing gluten from starch comprising a frusto conical imperforate receptacle having a roughened surface and having its smaller end down, a frusto conical imperforate member having a roughened surface and having its smaller end down, said member being spaced within said receptacle to form an annular chamber, and the walls of said receptacle and member being inclined at different angles whereby said chamber is narrower at its lower end than at its upper end, means for rotating said member for kneading dough in said annular space, means for introducing water into said space to wash the starch out of the dough, and means for permitting escape of the water and starch while retaining the gluten.

2. A device for freeing gluten from starch comprising a frusto conical imperforate receptacle having a roughened surface and having its smaller end down, a frusto conical imperforate member having a roughened surface and having its smaller end down, said member being spaced within said receptacle to form an annular chamber, means for rotating said member for kneading the dough in said annular chamber, a spiral flange secured to said member for holding the dough downwardly in said chamber, means for introducing water into said space to wash the starch out of the dough, and means for permitting escape of the water and starch while retaining the gluten.

In testimony whereof I hereunto affix my signature.

CHARLES H. BRIGGS.